United States Patent [19]

Hallock, III

[11] Patent Number: 5,394,768
[45] Date of Patent: Mar. 7, 1995

[54] BICYCLE CABLE

[76] Inventor: Orrin S. Hallock, III, 33 Roberts Rd., Cambridge, Mass. 02138

[21] Appl. No.: 99,125

[22] Filed: Jul. 29, 1993

[51] Int. Cl.$^6$ .............................................. F16C 1/20
[52] U.S. Cl. .................. 74/502.5; 74/502.6; 29/515; 29/516
[58] Field of Search ............... 74/502.5, 502.4, 502.6, 74/500.5; 29/515, 516

[56] References Cited

U.S. PATENT DOCUMENTS

| | | | |
|---|---|---|---|
| 2,009,206 | 7/1935 | Rosner | 74/502.6 X |
| 4,704,044 | 11/1987 | Yoshigai | 74/502.4 X |
| 4,850,084 | 7/1989 | Iwasaki | 74/502.4 X |

FOREIGN PATENT DOCUMENTS 692859 6/1953 United Kingdom ............... 74/502.5

Primary Examiner—Charles A. Marmor
Assistant Examiner—Peter Kwon

[57] ABSTRACT

The object of the invention is to provide a multi strand bicycle pull cable with a fixed cable anchor at either terminal end thereof, wherein the cable directly forward of the anchors is provided with a fixative to prevent unraveling after a cable anchor has been removed, A bicycle pull cable comprised of a multi strand metal cable (1) having a cable anchor (2) secured to either end, portions of the cable at least directly abutting the anchors are bound (3) by a fixing agent to prevent unwinding of the strands of the cable after an anchor has been cut from the cable by cutting across a bound portion of the cable.

1 Claim, 1 Drawing Sheet

BICYCLE CABLE

TECHNICAL FIELD

The present invention relates to bicycle pull cables.

A common problem with bicycle pull cables is fraying of the cable once a metal cable anchor is chosen for mounting, and the opposite cable anchor cut off for threading the cable through cable casing, cable ferrules, and cable adjustment barrels etc.

BACKGROUND ART

The prior art is comprised of multi strand bicycle pull cables constructed with a metal cable anchor at either end, to allow a choice of cable anchors to choose from to match the fitting of a bicycle operation device. One of the cable anchors to be cut off to allow the installation of the cable.

DISCLOSURE OF INVENTION

In accordance with the invention there is provided a metal multi strand woven bicycle pull cable, having a cable anchor at either end, the cable directly adjacent the anchor of either end is bound with a fixer so that when one of the cable anchors is cut off for threading the cable through the cable supports of a given cable path, the cut end of the cable is bound and will not fray and become caught or ruin the cable.

BRIEF DESCRIPTION OF DRAWINGS

The construction of the invention will be discussed in conjunction with drawing FIG. 1, which presents a perspective view of an embodiment of the invention. Best mode for carrying out the invention, referring now to FIG. 1 by reference characters there is shown a metal multiple wire strand bicycle pull cable I having a different shaped metal cable anchor 2 secured to either end by compression, after a longer length thereof has been bathed in solder 3 to prevent unraveling of the wires after a cable anchor has been cut off to install the cable by threading through a given cable path.

The invention possesses the advantage of providing a multi strand bicycle pull cable with fixed cable anchors at either end. The cable at least directly abutting the fixed anchors thereof are bound together by a fixer to prevent fraying after a cable anchor is cut off one of the ends.

Figure 1:
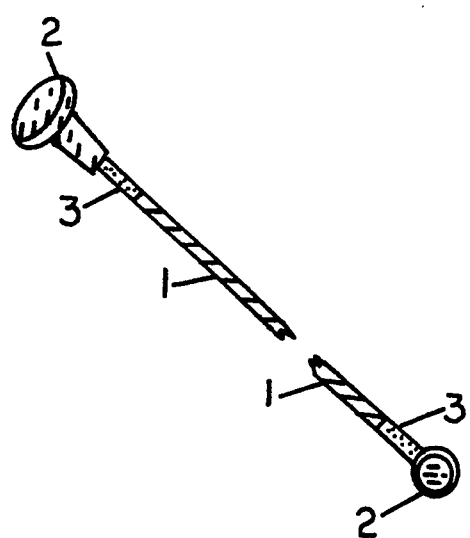

I claim:

1. A multi strand bicycle pull cable having a fixed cable anchor at either terminal end, portions of said cable at least abutting and forward of either of said cable anchors have binding means to deter unraveling of the cable end once an anchor has been cut off to install the cable.

* * * * *